US011829936B2

(12) United States Patent
Boer et al.

(10) Patent No.: US 11,829,936 B2
(45) Date of Patent: Nov. 28, 2023

(54) METHOD, CONTAINER, AND TRANSPORT VEHICLE FOR PREPARATION AND TRANSPORTATION OF SHIPMENTS OF GOODS

(71) Applicant: Dematic Corp., Grand Rapids, MI (US)

(72) Inventors: William R. Boer, Wayland, MI (US); Ed Vance, Lowell, MI (US)

(73) Assignee: Dematic Corp., Grand Rapids, MI (US)

( * ) Notice: Subject to any disclaimer, the term of this patent is extended or adjusted under 35 U.S.C. 154(b) by 170 days.

(21) Appl. No.: 17/178,982

(22) Filed: Feb. 18, 2021

(65) Prior Publication Data

US 2021/0256470 A1    Aug. 19, 2021

Related U.S. Application Data

(60) Provisional application No. 62/978,090, filed on Feb. 18, 2020.

(51) Int. Cl.
*G06Q 10/08* (2023.01)
*G06Q 10/0835* (2023.01)
(Continued)

(52) U.S. Cl.
CPC .......... *G06Q 10/0835* (2013.01); *B07C 1/18* (2013.01); *B62B 1/145* (2013.01); *B65G 59/00* (2013.01);
(Continued)

(58) Field of Classification Search
CPC ...... G06Q 10/0835; B07C 1/18; B62B 1/145; B65G 59/00; B65G 61/00
See application file for complete search history.

(56) References Cited

U.S. PATENT DOCUMENTS 3,294,306 A * 12/1966 Areddy ............... B65D 19/20
217/69
4,550,830 A * 11/1985 Shuert ................. B65D 19/06
206/386
(Continued)

OTHER PUBLICATIONS

International Search Report and Written Opinion of the International Searching Authority from corresponding Patent Cooperation Treaty (PCT) Application No. PCT/IB21/51403, indicated dated Jun. 27, 2021.

*Primary Examiner* — Kyle O Logan
(74) *Attorney, Agent, or Firm* — Gardner, Linn, Burkhart & Ondersma LLP

(57) ABSTRACT

A method, a palletizing sleeve, and a hand truck are provided for preparing a plurality of shipments of goods and transporting each shipment to one of a plurality of delivery destinations. The method includes determining the goods for the shipment, virtually building an optimized stacking configuration of those goods, physically building the stack based on the optimized configuration, transporting the shipment to a pre-determined delivery destination, and unloading the shipment at the delivery destination. The palletizing sleeve includes a base and a vertical wall that cooperate to support and stabilize a stack of goods that make up a portion of the shipment. Standoffs on the sleeve base provide openings to accept forks from the hand truck so that the hand truck can engage the sleeve from underneath the base. A fork height adjustment system selectively adjusts the fork height relative to the bottom of the hand truck.

20 Claims, 9 Drawing Sheets

(51) Int. Cl.
  *B65G 61/00* (2006.01)
  *G06Q 10/0875* (2023.01)
  *B62B 1/14* (2006.01)
  *B07C 1/18* (2006.01)
  *B65G 59/00* (2006.01)

(52) U.S. Cl.
  CPC ......... *B65G 61/00* (2013.01); *G06Q 10/0875* (2013.01)

(56) References Cited

U.S. PATENT DOCUMENTS

| | | | | |
|---|---|---|---|---|
| 5,371,940 | A * | 12/1994 | Suzuki | H05K 13/087 29/784 |
| 5,417,541 | A * | 5/1995 | Herron | B66F 9/06 414/346 |
| 6,230,383 | B1 * | 5/2001 | Welleman | B65D 19/0095 29/430 |
| 6,234,087 | B1 * | 5/2001 | Brown | B65D 19/004 108/56.1 |
| 6,626,634 | B2 * | 9/2003 | Hwang | B62B 1/10 108/51.11 |
| 6,874,981 | B1 * | 4/2005 | Krawczyk | B60P 7/13 410/67 |
| 9,505,595 | B1 | 11/2016 | Smith et al. | |
| 9,555,925 | B2 * | 1/2017 | Marchek | B65D 19/06 |
| 2001/0041131 | A1 * | 11/2001 | Hwang | G06Q 10/087 414/800 |
| 2002/0101049 | A1 * | 8/2002 | Krawczyk | B62B 3/003 280/47.35 |
| 2005/0199623 | A1 * | 9/2005 | Elder | B65D 19/18 220/4.28 |
| 2007/0193479 | A1 * | 8/2007 | Slaats | A47F 5/0018 206/386 |
| 2007/0246398 | A1 | 10/2007 | Pedler | |
| 2008/0028998 | A1 | 2/2008 | Hedstrom | |
| 2008/0046116 | A1 | 2/2008 | Khan et al. | |
| 2008/0112782 | A1 * | 5/2008 | Leahy | A47F 1/12 414/281 |
| 2008/0131255 | A1 * | 6/2008 | Hessler | B65B 35/50 901/14 |
| 2008/0199297 | A1 * | 8/2008 | Grunbach | G06Q 10/087 414/802 |
| 2008/0267759 | A1 * | 10/2008 | Morency | B65G 60/00 414/788.1 |
| 2008/0315537 | A1 * | 12/2008 | Dobra | B62B 5/049 280/755 |
| 2011/0137624 | A1 * | 6/2011 | Weisman | A61F 13/5511 703/2 |
| 2012/0075071 | A1 * | 3/2012 | Liu | B65D 19/001 235/492 |
| 2013/0032507 | A1 * | 2/2013 | Du Toit | B65D 19/0018 206/599 |
| 2013/0282165 | A1 * | 10/2013 | Pankratov | B65G 57/09 700/217 |
| 2015/0027351 | A1 * | 1/2015 | Marchek | B65D 19/06 108/53.5 |
| 2015/0068436 | A1 * | 3/2015 | Zelek | B65D 21/0233 108/53.3 |
| 2015/0108037 | A1 * | 4/2015 | Evans | B65D 19/18 108/50.11 |
| 2016/0167831 | A1 * | 6/2016 | Suiter | B65D 19/0004 108/55.3 |
| 2016/0194110 | A1 * | 7/2016 | Balazs | B65D 19/44 206/386 |
| 2019/0080283 | A1 * | 3/2019 | Millhouse | B65G 61/00 |
| 2020/0048017 | A1 * | 2/2020 | Meurer | B65G 57/00 |
| 2020/0242543 | A1 * | 7/2020 | Fu | G06Q 10/043 |
| 2021/0256470 | A1 * | 8/2021 | Boer | G06Q 10/0835 |
| 2021/0380356 | A1 * | 12/2021 | Miller | B25J 9/1628 |
| 2022/0073280 | A1 * | 3/2022 | Gentilini | B65G 1/1375 |
| 2022/0245576 | A1 * | 8/2022 | Huang | G01C 21/343 |

* cited by examiner

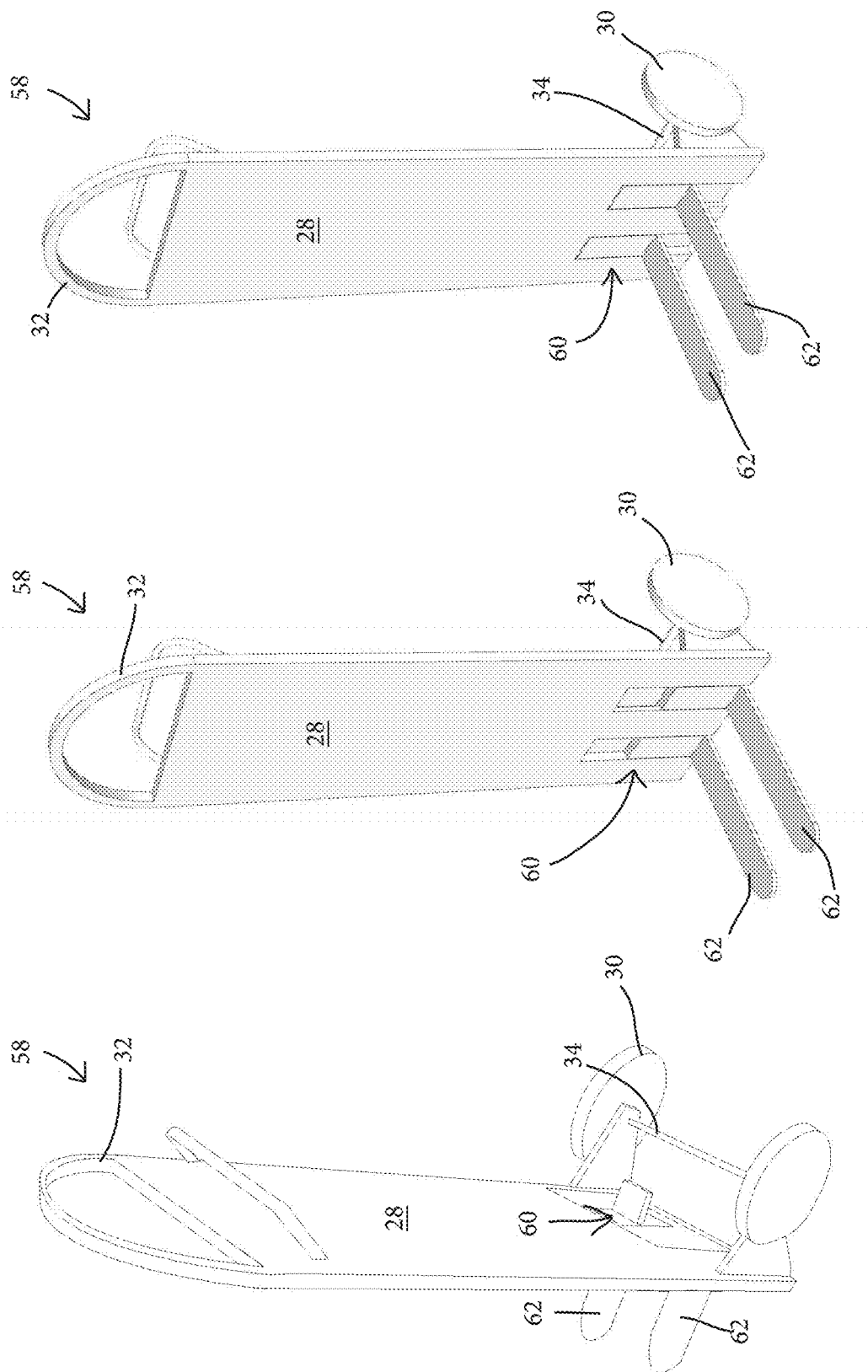

METHOD, CONTAINER, AND TRANSPORT VEHICLE FOR PREPARATION AND TRANSPORTATION OF SHIPMENTS OF GOODS

CROSS REFERENCE TO RELATED APPLICATION

The present application claims priority of U.S. provisional application Ser. No. 62/978,090 filed Feb. 18, 2020, which is hereby incorporated herein by reference in its entirety.

FIELD OF THE INVENTION

The present invention is directed to a method and corresponding apparatuses for preparing and transporting shipments of goods, and in particular, a container for segregating a shipment of goods and a transportation vehicle for transporting the container.

BACKGROUND OF THE INVENTION

Order fulfillment for convenience stores, grocery stores, and the like, often include an inventory and quantity of items that is substantial but does not require an entire pallet for transportation of those goods. Delivery personnel are often required to retrieve the items for a shipment from a pallet that has items for multiple shipments stored thereon. The delivery personnel is thus required to physically choose the appropriate goods and manually transport them, such as by loading them onto a hand truck one by one. Delivery trucks often include multiple temperature zones for shipping goods to customers, such as grocery store or convenience stores. Customer shipments often include items that are stored in the various temperature zones, requiring the delivery operator to manually retrieve items from each of the zones and stack them onto a hand truck to transport them into the customers building. When an operator or delivery personnel retrieves items from various locations of a truck (e.g. a frozen section, a chilled section, or an ambient section) the personnel may stack items on the hand truck and end up having heavy items on top, which is less safe than having the heavy items on the bottom.

SUMMARY OF THE INVENTION

The present invention provides a method and apparatuses for preparing a plurality of shipments of goods and transporting the shipments to a plurality of delivery destinations. Often times, a shipment of goods requires a substantial quantity of items or cases of items, however, the shipment of goods may not require an entire pallet to support and transport the shipment. The method and corresponding apparatuses provide for preparation and transportation of such shipments, wherein a palletizing sleeves receives and support a stock of the goods for the shipment and a hand truck provides a transportation vehicle for retrieving and transporting the palletizing sleeves from a pallet to a delivery destination, such as a convenience store. The method may be substantially automated to facilitate efficiency of time, material, and labor.

According to one form of the present invention, a method is provided for preparing a plurality of shipments of goods and transporting the shipments to at least one of a plurality of delivery destinations. The method includes the step of determining an inventory of goods to be delivered to a delivery destination to fulfil a customer order. The goods for the order are evaluated and the method virtually builds or creates an optimized virtual build for the inventory of goods to be delivered, such as with a pallet building software. The method includes physically building a stack of the inventory of goods based on the optimized virtual build of the inventory of goods on a palletizing sleeve. Preferably the method utilizes automated palletizer to build the physical stack of goods, however, the stack of goods may be built by a human operator or selector. The palletizer may be an automated palletizer, such as an automated mixed case palletizer. The method includes transporting the palletizing sleeve with the inventory of goods to a delivery destination and unloading the palletizing sleeve at the delivery destination.

In one aspect, the determining of an inventory of goods is performed by an automated order fulfilment management system. In another aspect, the virtually building of the optimized build is performed by an automated build optimizer. The automated mixed case palletizing system may include a robotic palletizer. In still another aspect, the transporting of the palletizing sleeve includes placing the palletizing sleeve onto a pallet, transporting that pallet to a delivery truck, and driving the delivery truck to the delivery destination. Alternatively, the palletizing sleeve may be handle individually and loaded directly onto a delivery vehicle (e.g. the sleeves are retrieved from a facility floor and transported on the floor of the delivery vehicle), thus omitting the need for a pallet. Once at the delivery destination, the unloading of the palletizing sleeve may be performed by a human operator using a forked hand truck that is configured to retrieve the palletizing sleeve from the pallet. Optionally, each of the plurality of shipments on a particular pallet are stacked on an individual, dedicated palletizing sleeve such that each palletizing sleeve is "destination pure" and requires no manual selection of goods from the palletizing sleeve prior to unloading at the delivery destination.

In another form of the present invention, a container or "palletizing sleeve" for receiving, segregating, supporting, and transporting a plurality of goods includes a base portion configured to support the plurality of goods thereon and a substantially vertical wall extending upwardly proximate an exterior edge of the base portion. The base portion and the vertical wall cooperate to support, stabilize, and partially confine a plurality of goods stacked on the sleeve. The base portion is at least partially smaller than a standard pallet, such that a plurality of sleeves may be stacked onto a single pallet. The palletizing sleeve may include a plurality of the substantially vertical walls defining an exterior wall disposed along at least a portion of the exterior edge of the base portion.

In one aspect, the palletizing sleeve includes a plurality of support blocks disposed on a bottom portion of the base portion to provide a standoff between the base portion and a ground surface. The plurality of support blocks are spaced in a rectangular grid arrangement on the bottom portion of the base portion such that a hand truck is selectively engageable underneath a portion of the base portion.

In another aspect, the vertical wall of the palletizing sleeve is coupled to the base portion such that a plurality of the palletizing sleeves are nestable and stackable with each other. When the sleeves are nested, they require less space for return transportation or while they await reuse. In still another aspect, the palletizing sleeve includes a machine readable identification label that provides information of the goods stacked on the sleeve, such as for providing delivery instructions to delivery personnel. The identification label may be a bar code, an RFID tag, a QR code, or the like.

According to another form of the present invention, a hand truck having a selectively adjustable platform is provided for transporting items between a pallet and a delivery destination. The hand truck includes a main frame defining a substantially rigid support structure of the hand truck and a plurality of wheels to transportably support the main frame about a ground surface. The hand truck includes a selectively operable height adjustment system for adjusting the height of a platform which is configured for engaging and supporting an item from a pallet surface and/or a ground surface.

In one aspect, the platform of the hand truck includes a set of forks configured to selectively engage a base portion of a palletizing sleeve. The hand truck is particularly well suited for retrieving the palletizing sleeve from a pallet surface while the wheels of the hand truck are supported by a ground surface that is below the pallet surface. The height adjustment system is selectively operable and may be manually adjustable and configured to allow an operator to manually selectively raise and lower the adjustable platform relative to a bottom portion of the main frame of the hand truck. Thus, the hand truck may be utilized to retrieve sleeves from a floor surface or from a pallet surface, as necessary. In another aspect, the selectively operable height adjustment system may be an automatic adjustment system configured to automatically selectively raise and lower the adjustable platform relative to a bottom portion of the main frame of the hand truck.

Accordingly, embodiments of the present invention include a method and apparatuses for preparing a shipment for a particular customer and transporting the shipment to the customer's delivery destination. The method and apparatuses are particularly well suited for shipments of goods that do not require an entire pallet for the quantity of goods in the shipment. A palletizing sleeve provides a container to receive, support, stabilize, and transport at least a portion of a shipment of goods. A hand truck that includes a selectively operable adjustable platform is provided for retrieving the palletizing sleeves from a pallet. The method may be performed by various automated systems to efficiently facilitate the preparation and transportation of a shipment of goods, including reducing physical labor by delivery personnel during transportation and unloading of goods at the predetermined delivery destination.

These and other objects, advantages, purposes and features of this invention will become apparent upon review of the following specification in conjunction with the drawings.

BRIEF DESCRIPTION OF THE DRAWINGS

FIG. 14 is a rear-side perspective view of an adjustable hand truck in accordance with the present invention;

FIG. 15 is a front-side perspective view of the adjustable hand truck of FIG. 14, depicted with adjustable forks in a lowered position; and FIG. 16 is another perspective view of the adjustable hand truck of FIG. 14, depicted with the adjustable forks in a raised position.

DESCRIPTION OF THE PREFERRED EMBODIMENTS

Figure 1:
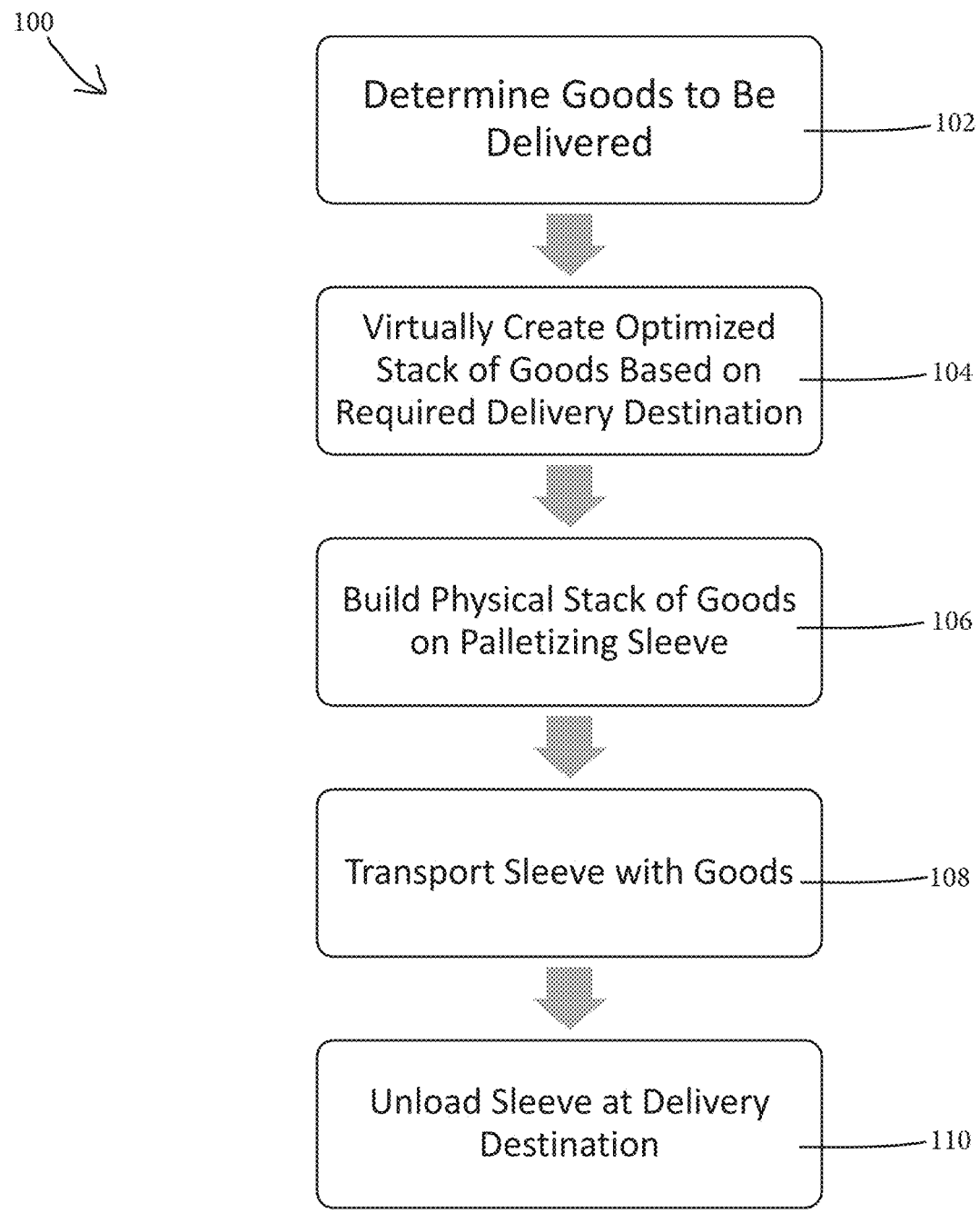
FIG. 1 is a diagram of a method for preparing a plurality of shipments of goods and transporting the shipments to a plurality of delivery destinations in accordance with the present invention.
Figure 2:
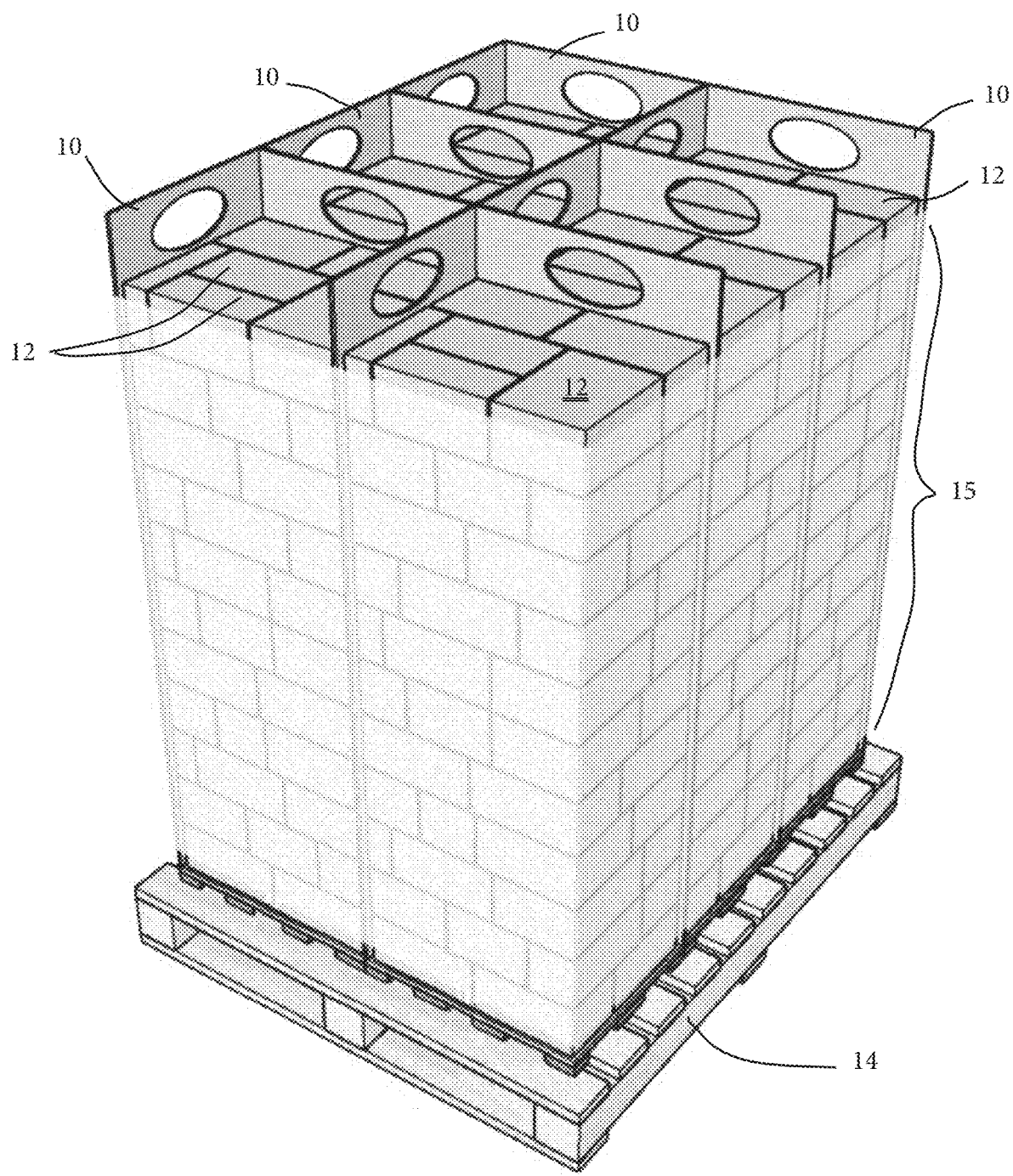
FIG. 2 is a perspective view of a plurality of palletizing sleeves in accordance with the present invention, depicted with a wrapping shown in phantom.

Referring now to the drawings and the illustrative embodiments depicted therein, a method and systems for preparing shipments and transporting the shipments to multiple delivery destinations while reducing manual labor and shipment management by an operator. The method may be performed with various automated systems including automated order fulfilment systems, automated packing systems to virtually build optimized stacks of items, automated palletizing systems, and automated pallet transportation systems. A container or palletizing sleeve 10 is provided for receiving and supporting a stack or "build" of items 12 that make up a shipment of goods for a particular delivery destination. A plurality of palletizing sleeves 10 may be loaded onto a standard shipping pallet 14 to allow standard pallet transportation vehicles to transport a plurality of sleeves 10 at one time. A transport vehicle, in the form of a hand truck 16, provides a transportation vehicle for transporting an individual palletizing sleeve 10 from a pallet 14 to a delivery destination, such as a ground surface, and vice versa. The method, sleeves, and hand truck are useful for preparing shipments and transporting a multitude of goods, including fresh foods, frozen foods, beverages, home goods, and the like.

In the illustrated embodiment of FIG. 1, a method 100 is provided for preparing a plurality of shipments of goods and transporting the shipments to a plurality of delivery destinations. Each shipment of goods has a predetermined delivery destination, such as a grocery store, a restaurant, or a convenience store wherein each shipment may be mixed such that it includes items 12 required at multiple delivery destinations or "destination pure" such that each shipment contains only items 12 required at one particular delivery destination. The method 100 is particularly well suited for creating an optimized stack of items 12 on a palletizing sleeve 10 to be delivered to the predetermined destination without requiring extensive physical labor by a delivery vehicle operator. The method 100 is well suited for preparing multiple "destination pure" shipments of goods that are each prepared to be delivered to only one of the multiple delivery destinations. The method 100 provides for efficient unloading of a delivery vehicle at each delivery destination.

Method 100 includes the steps of determining 102 an inventory of goods to be delivered to a predetermined delivery destination, virtually building (i.e. creating) 104 an optimized "build" or stacking configuration for that inventory of goods to be delivered, physically building (i.e. stacking or packing) 106 the optimized build of the inventory of goods on a palletizing sleeve with a palletizer, transporting 108 the palletizing sleeve with the inventory of goods to its predetermined delivery destination, and unloading 110 the palletizing sleeve with the inventory of goods at the delivery destination (FIG. 1).

At 102, the method evaluates a plurality of customer orders and delivery routes provided by the automated order fulfilment system to determine what goods are required for a specific shipment of goods to be delivered to a predetermined delivery destination. The virtual creation 104 of the optimized build of the goods may be performed by an automated packing system that employs a pallet building software to determine the optimized configuration of the goods 12 for a shipment to provide the greatest level of stability of the stack for transportation and movement of those goods. The virtual creation 104 of the optimized build may also create a pallet build plan which includes the use of multiple sleeves of stacked goods 12 to create an optimized pallet of shipments. The bottom perimeter of the optimized stack is determined as a function of the perimeter size of a palletizing sleeve 10 on which the goods are to be stacked, such that when the goods are stacked in the sleeve 10 they are substantially within an envelope defined by the bottom perimeter of the sleeve 10. The heaviest items of the shipment are placed on the bottom of the sleeve 10 to ensure stability of the sleeve 10 and reduce potential for injury for delivery personnel. The method 10 can be used for "mixed pallets"/"mixed sleeves" to deliver one portion of goods stacked on a sleeve 10 to one destination and the other portion of goods stacked on that sleeve 10 to a different destination. After the optimized build is determined at 104, the method 100 includes physically building 106 the stack of goods 12 onto a palletizing sleeve 10 with a palletizer. The palletizer may be an automatic palletizer such as the Automated Mixed Case Palletizer (AMCAP) marketed by Dematic Corp. The palletizer may include a plurality of robotic palletizer arms (not shown) that are adapted to stacking the goods in their optimal location on the sleeve 10. While the palletizing sleeves are particularly well suited for use with automated palletizers, the sleeves can be used with manually loaded goods as well.

The method 100 then includes transporting 108 the shipment of goods on the palletizing sleeve to the predetermined delivery location. The transporting 108 of the shipments may include various forms of transportation systems, including a conventional lift truck or autonomously guided vehicle (AGV). A plurality of palletizing sleeves 10, such as six sleeves, may be stacked on a single pallet 14 for transportation. The pallet 14 is loaded onto a delivery vehicle to deliver the shipments of goods to a delivery destination. Each palletizing sleeve 10 on the pallet 14 may be destination pure such that all goods one that particular palletizing sleeve 10 are to be delivered to one delivery destination. An entire pallet 14 of sleeves 10 may be destination pure such that all sleeves 10 on that pallet are to be delivered to that same delivery destination. Alternatively, a palletizing sleeve 10 may not be destination pure (i.e. mixed) such that one portion of the goods on that particular palletizing sleeve 10 may be prepared for delivery to one destination while the other portion of goods on that sleeve 10 are prepared for a different delivery destination. Method 100 includes unloading the shipment of goods 110 by retrieving a palletizing sleeve 10 from a pallet 14 from inside of the delivery vehicle, for which a hand truck 16 is provided to engage and transport the sleeve 10. The hand truck 16 is adjustably configured to retrieve sleeves 10 from the surface height of the pallet 14 and to deliver or drop the sleeves 10 off at a ground surface height. During unloading 110, an operator may scan a "license plate" (e.g. bar code or other machine readable identification) on a particular sleeve 10 to determine if that sleeve is to be unloaded and delivered at the current delivery location. Scanning the license plate of a sleeve 10 may also automatically update inventory information within the automated order fulfilment system or a delivery management system to keep track of what shipments have been delivered.

In some instances, a shipment of goods for a single delivery destination may require items 12 that require different temperatures (e.g. frozen, chilled, or ambient temperatures). Delivery personnel often retrieve items from each zone of a truck and may stack heavy items on top of lighter items which may increase potential for injuries. By reducing the need for delivery personnel to manually stack goods from pallets, the method 100 reduces potential for injuries. A single palletizing sleeve 10 may be provided for each portion of the goods 12 for a shipment at each temperature level, for example, if a shipment contains some frozen items, those items are stacked on a single palletizing sleeve 10 and the personnel will retrieve that sleeve with only those frozen goods and transport it independently to the delivery destination with the hand truck 16. It will be appreciated that while it is preferable to provide separate sleeves for goods based on their temperature requirements, that any configuration of goods may be stacked on a palletizing sleeve. For example, one palletizing sleeve may include only frozen goods and another may include only chilled goods. For another example, one palletizing sleeve may include a combination of frozen, chilled, and ambient temperature goods.

As illustrated in FIGS. 2-10, a palletizing sleeve 10 is provided for segregating and supporting a stack of goods 12 defining a particular shipment of goods to be delivered to a pre-determined delivery destination. The palletizing sleeve 10 provides a containment unit for the shipment of goods that is ergonomic and efficient to facilitate the shipment of the goods and the sleeve 10 provides stability to the stacked column of goods 12 when moving the stack. In the illustrated embodiment, the palletizing sleeve includes a vertical wall or walls 18 that define a vertical support or barrier to stack and confine goods 12 against (FIGS. 3-10). The vertical walls 18 are coupled to and extend upward from a rectangular perimeter of a support base 20 that defines a platform for goods 12 to be stacked thereon. The palletizing sleeve 10 may be constructed from plastic corrugate, injection molded plastic, wood, metal, or other resilient material. While the perimeter of the illustrated embodiment is rectangular, it will be appreciated that other shapes may be employed for the support base, such as a triangle, a trapezoid, a diamond, an oval, etc. Further, it will be appreciated that the palletizing sleeve 10 is sufficiently lightweight as to allow a human operator to ergonomically and safely manipulate the sleeve 10 when it is empty or when it is loaded with relatively lightweight goods.

Figure 7:
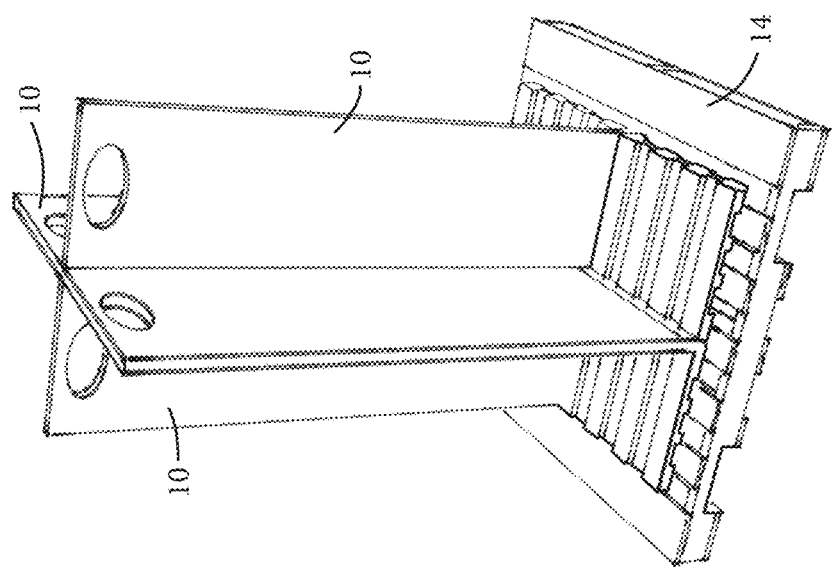
FIG. 7 is a perspective view of four of the palletizing sleeves of FIG. 4, arranged on a pallet in a non-uniform configuration.
Figure 6:
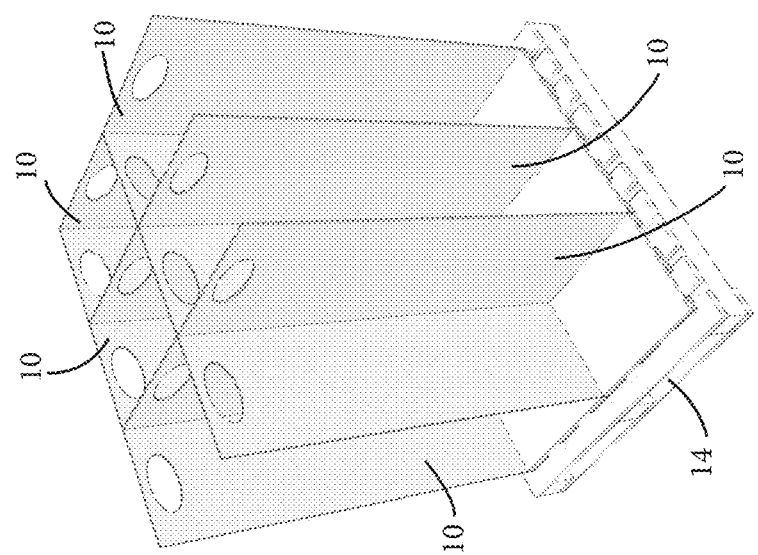
FIG. 6 is a front perspective view of six of the palletizing sleeves of FIG. 4 arranged on a pallet in a uniform configuration.

Each palletizing sleeve 10 is sized and shaped such that a plurality of sleeves 10 with shipments of goods can be loaded onto a standard pallet 14, such that a pallet transport vehicle is able to move multiple sleeves 10 at one time (FIGS. 6-7). The sleeves 10 may be uniformly stacked on the pallet 14 such that all sleeves are oriented in the same direction (FIG. 6), as well as non-uniformly stacked on the pallet 14 such that sleeves 10 are oriented in various directions (FIG. 7). A plurality of sleeves 10 stacked on a pallet 14 may be wrapped, such as with plastic wrap 15 as shown in phantom in FIG. 2, to provide additional stability when transporting the shipments. The plastic wrap 15 may be applied by an automatic palletizer. The vertical walls 18 each include a hole 22 proximate the upper portion of the wall 18. The holes 22 may be engaged by an operator to manipulate the sleeve 10, such as to ensure that the sleeve 10 moves with a hand truck 16 when tipping and transporting the hand truck 16. The holes 22 may be engaged by a robotic system to manipulate the sleeve 10 within that order fulfilment facility, such as to stack an empty sleeve 10 onto a pallet 14 prior to loading the sleeve 10 with goods 12. The sleeve 10 is held in place during palletizing (i.e. held in place during stacking goods for the shipment onto the sleeve 10).

Figure 9:
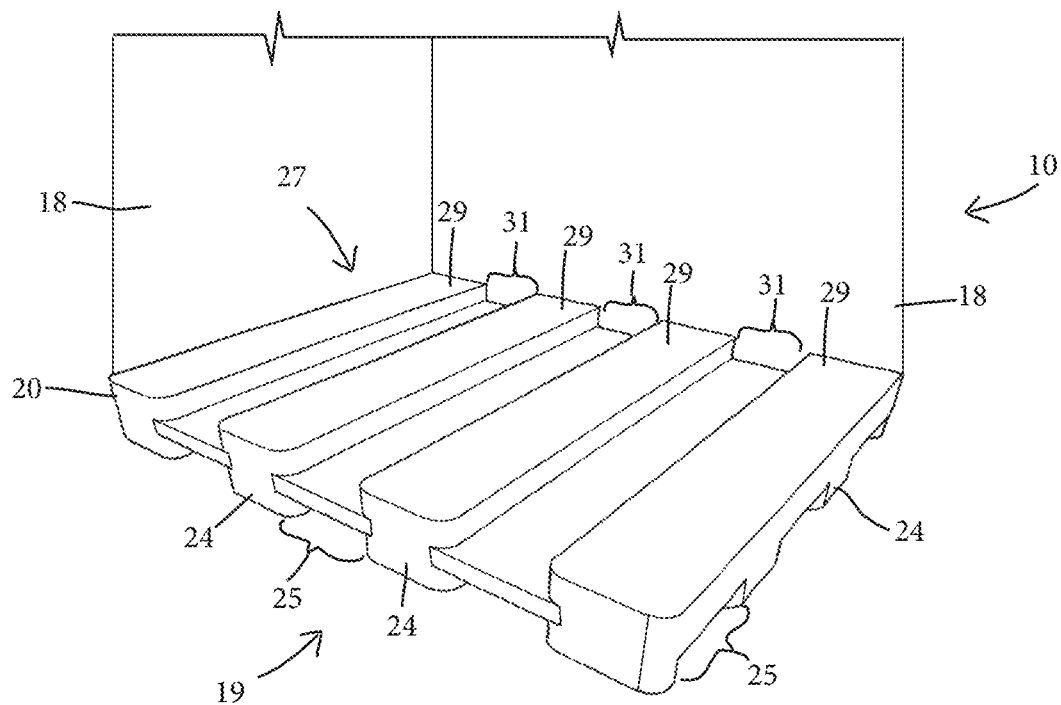
FIG. 9 is an enlarged perspective view of a base portion of the palletizing sleeve of FIG. 4.
Figure 10:
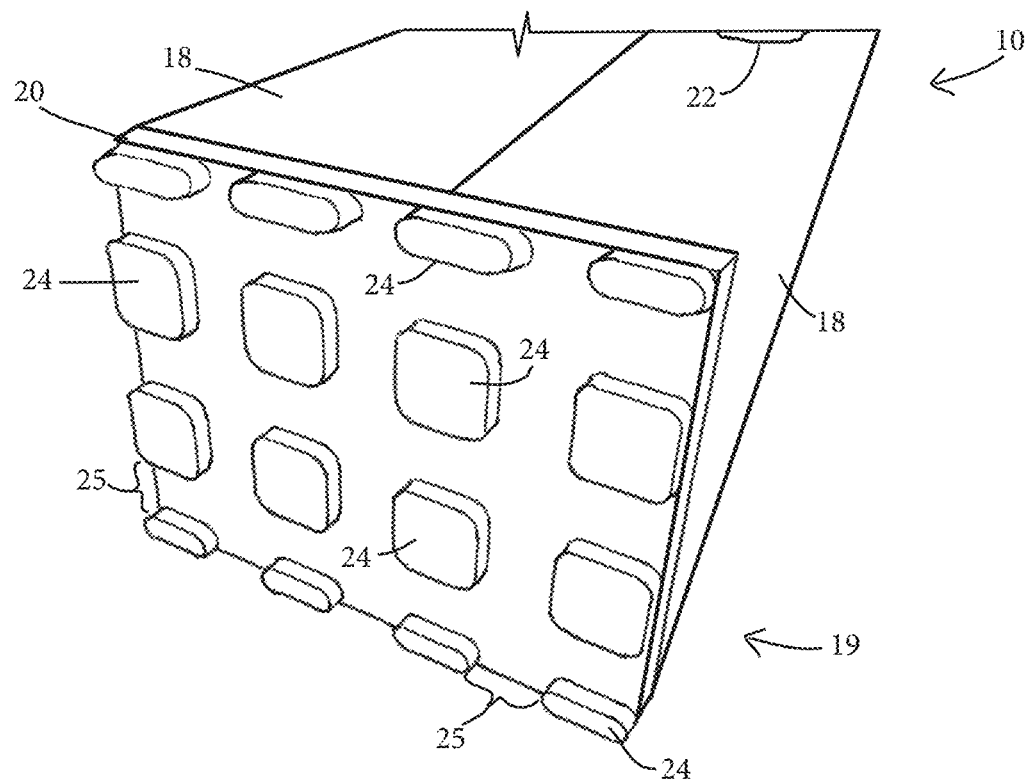
FIG. 10 is an enlarged bottom perspective view of the palletizing sleeve of FIG. 4.

As best shown in the illustrated embodiment of FIGS. 9-10, the support base 20 includes a vertical spacing element 19, defined by a plurality of risers, standoffs, feet, or support blocks 24 spaced along a bottom portion of the support base 20. The blocks 24 are located in spaced arrangement and configured such that a set of forks 26 on a hand truck 16 may selectively enter through openings or lower receiver channels 25 defined between gaps between the blocks 24 to allow the forks 26 (FIG. 3) to slide underneath the support base 20 in order to engage and lift the sleeve 10 from underneath the sleeve 10. As illustrated in FIG. 10, the blocks 24 may include various shapes and sizes to fit the support base 20 while accommodating the forks of a particular hand truck. In an optional embodiment, blocks 24 may be disposed on exterior corners of the bottom portion of the support base 20 such that a plate of a standard hand truck may enter underneath the support base 20. The support blocks 24 are slightly taller than the thickness of the forks 26 to allow the forks 26 to enter underneath the sleeve. Preferably, the blocks are configured to provide adequate support to the goods 12 stacked on the sleeve 10 and adequate support on the slats of the pallet 14 while providing sufficient spacing to allow the forks 26 to enter underneath the support base 20. The receiver channels 25 are preferably arranged in both perpendicular directions of the support base 20 to allow a hand truck 16 to access receiver channels from any side of the palletizing sleeve 10. However, it will be appreciated that the receiver channels may be provided in only one direction relative to the support base 20.

As illustrated in the embodiment of FIGS. 4 and 6-9, the support base 20 includes a goods riser or standoff element 27, defined by a plurality of standoffs or support blocks 29 spaced along an upper portion of the support base 20. Openings or spaces between the support blocks define upper receiver channels 31 to permit the forks 26 of a hand truck 16 to slide under the goods 12 supported on the support base 20. It will be appreciated that while the upper receiver channels 31 are provided in a single direction, the goods riser 27 may include a grid of support blocks similar to that of vertical support element 19. Thus, a user can selectively engage the palletizing sleeve 10 via the receiver channels 25 below the support base 20 or the goods via the upper receiver channels 31 above the support base 20. It will be appreciated that the lower receiver channels 25 and/or upper receiver channels 31 may be omitted while retaining many, if not all, of the advantages of the palletizing sleeve 10.

Figure 3:
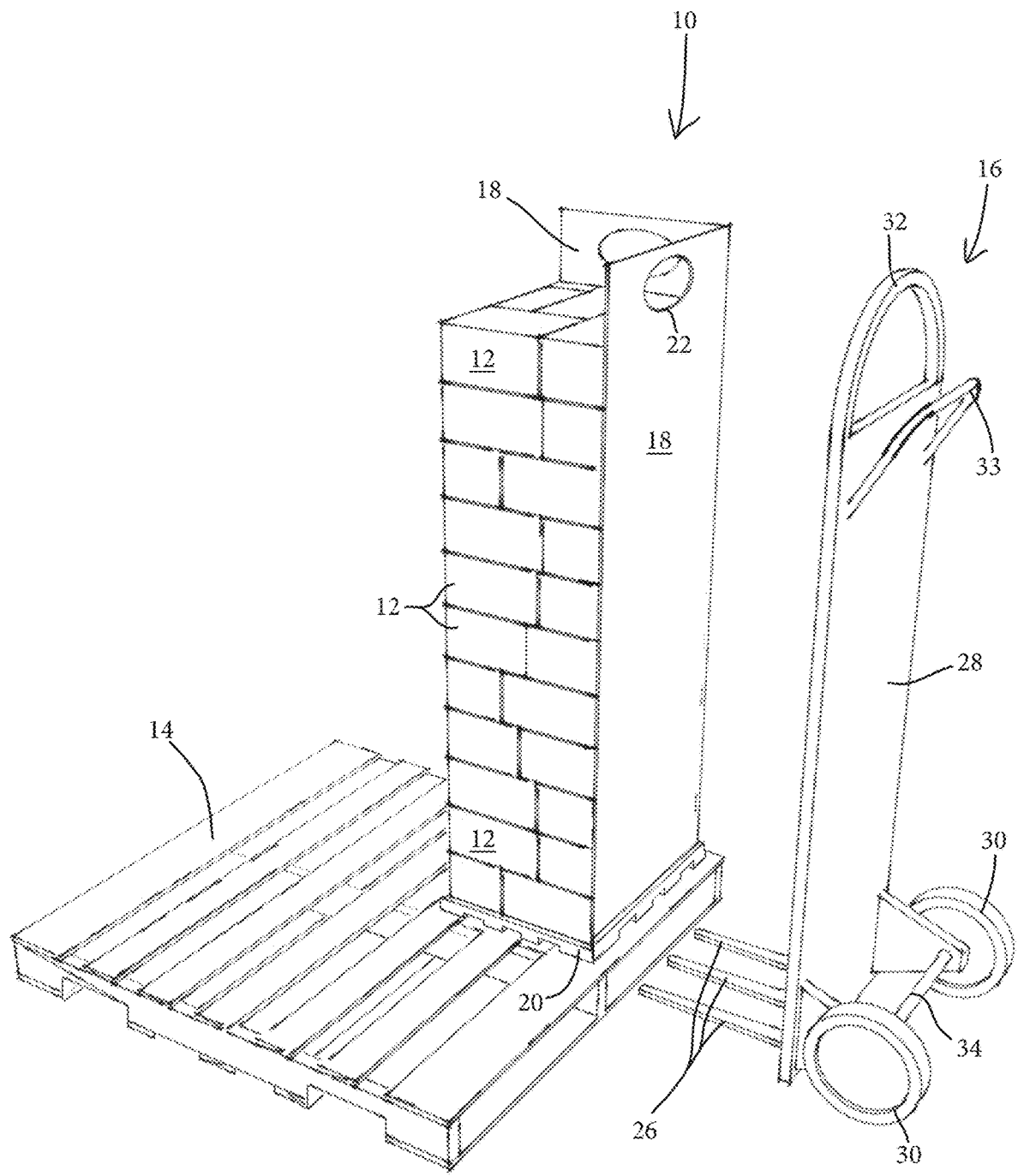
FIG. 3 is a perspective view of a palletizing sleeve depicted with goods stacked on the palletizing sleeve and a hand truck for transporting the palletizing sleeve, in accordance with the present invention.
Figure 5:
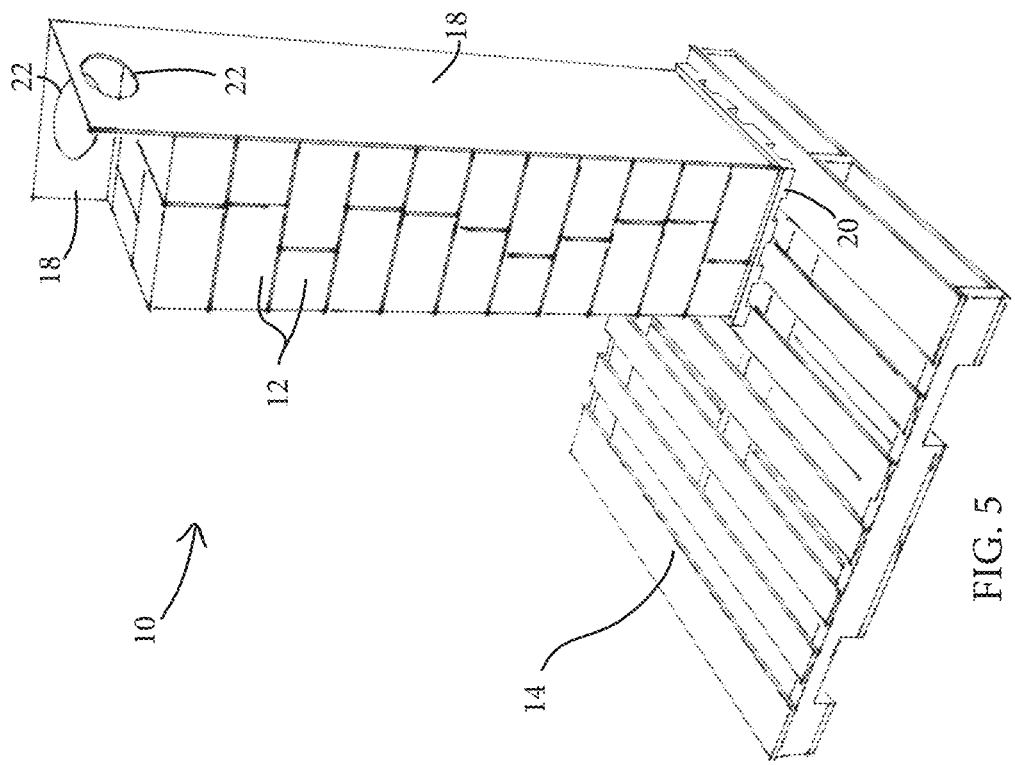
FIG. 5 is a perspective view of the palletizing sleeve of FIG. 4 depicted with goods stacked on the palletizing sleeve.
Figure 4:
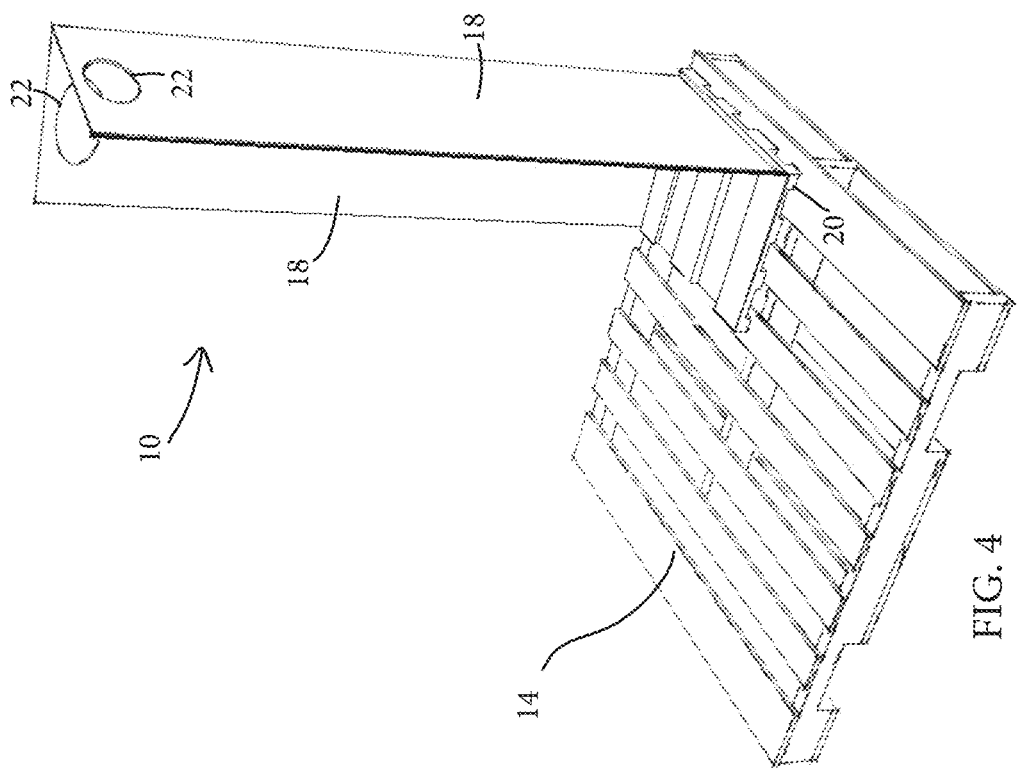
FIG. 4 is a perspective view of a single palletizing sleeve in accordance with the present invention, depicted on a pallet.
Figure 8:
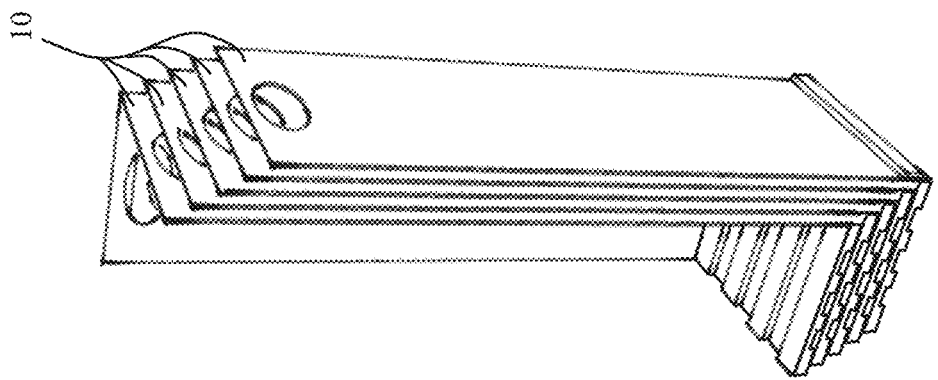
FIG. 8 is a rear-side perspective view of five of the palletizing sleeves of FIG. 4, depicted in a stacked and nested configuration.

An embodiment of a hand truck or manual transport vehicle 16 for transporting the palletizing sleeves 10 is illustrated in FIG. 3. The hand truck 16 includes a set of forks 26, alternative to a plate of standard fork trucks. The forks 26 are configured to enter through openings 25 formed by support blocks 24 on the bottom of palletizing sleeves 10. For example, the hand truck includes three forks 26 in the illustrated embodiments of FIG. 3, however other quantities of forks may be provided as desired and/or as required for strength and stability purposes, (see adjustable hand truck 36 described below). The hand truck includes a main frame or body 28 and a pair of wheels 30 disposed proximate a bottom rear portion of the frame 28. A handle 32 is disposed on an upper rear portion of the frame 28. A second handle 33 may be disposed on the frame 28 to provide multiple engagement points for an operator to manipulate the hand truck 16. A fulcrum bar 34 is provided between the wheels 30 to provide a leverage point to facilitate tipping of the hand truck 16 under the load of a palletizing sleeve with a shipment of goods disposed thereon (FIG. 3). While the palletizing sleeve 10 is particularly well suited for manual transport with a manually operated hand truck, it will be appreciated that an assisted or automated transport vehicle may engage and transport the sleeve 10. For example, a forked transport vehicle, such as a human operated pallet jack or an autonomous robot vehicle, may engage the support base 20 of the sleeve 10 and then transport the sleeve 10.

Figure 12:
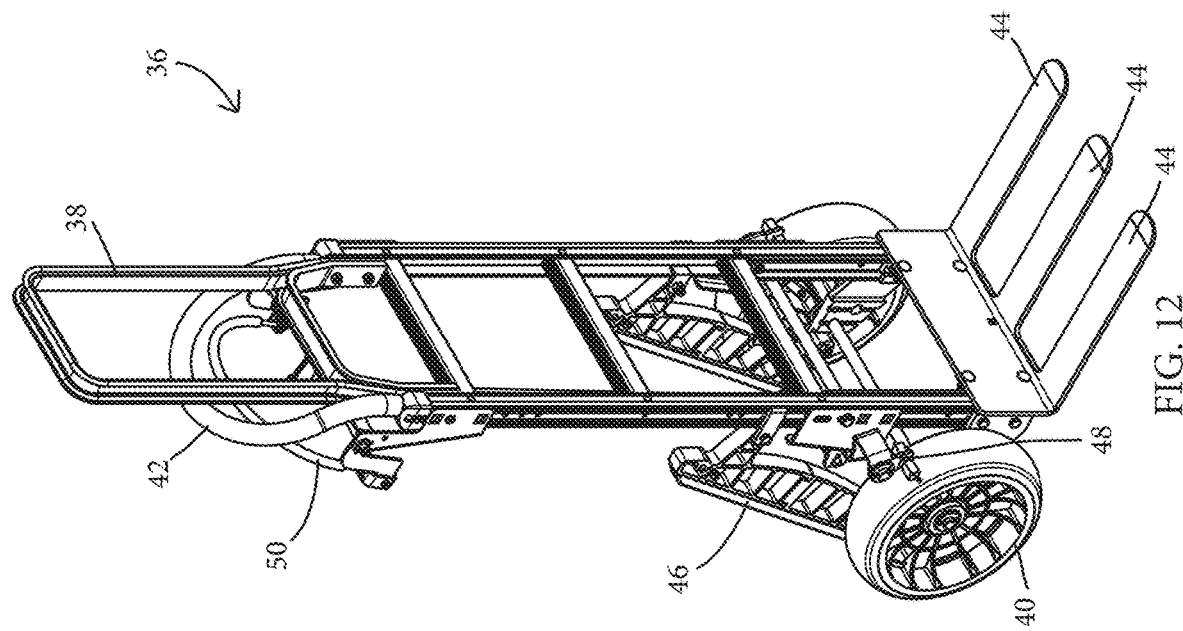
FIG. 12 is front-side perspective view of the hand truck of FIG. 11.
Figure 11:
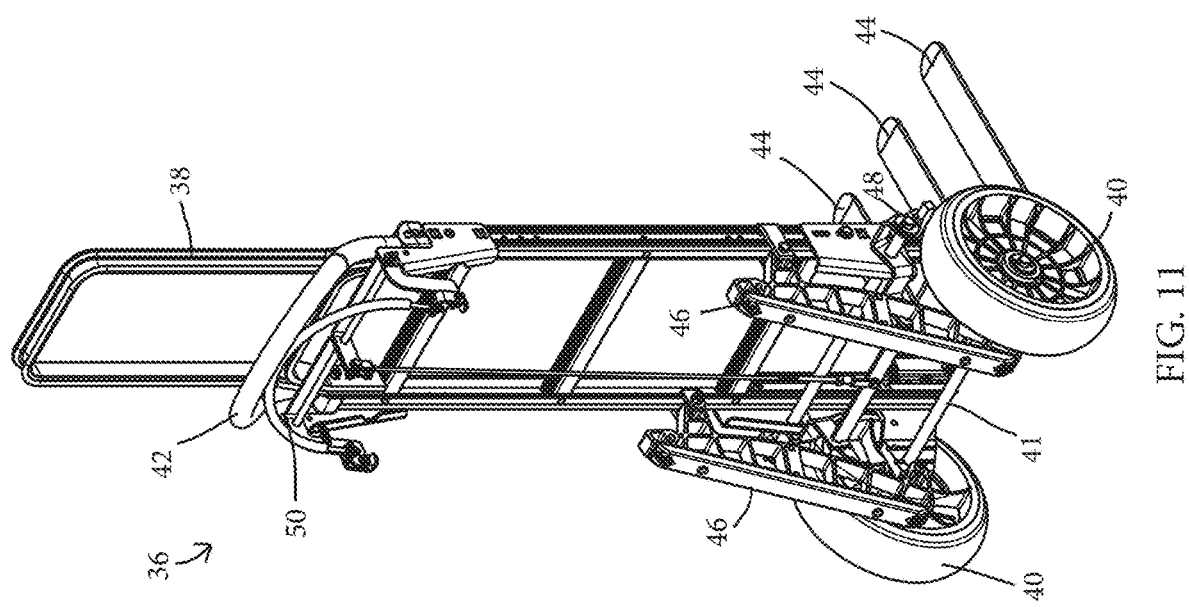
FIG. 11 is a rear-side perspective view of a hand truck in accordance with the present invention.

Another embodiment of a hand truck or manual transport vehicle 36 is provided for transporting palletizing sleeves 10 (FIGS. 11-12). The hand truck 36 is functionally and structurally similar in many ways to hand truck 16 and includes additional structures as compared to hand truck 16. The hand truck 36 includes a frame 38, a set of wheels 40, a fulcrum bar 41, a handle 42, and a set of three forks 44, however more or fewer forks may be provided as desired. The hand truck 36 includes stair assistance elements 46 such as commonly available for hand trucks as well as a hand-actuated wheel brake 48 that is operated via a lever 50 adjacent to the handle 42.

Figure 13:
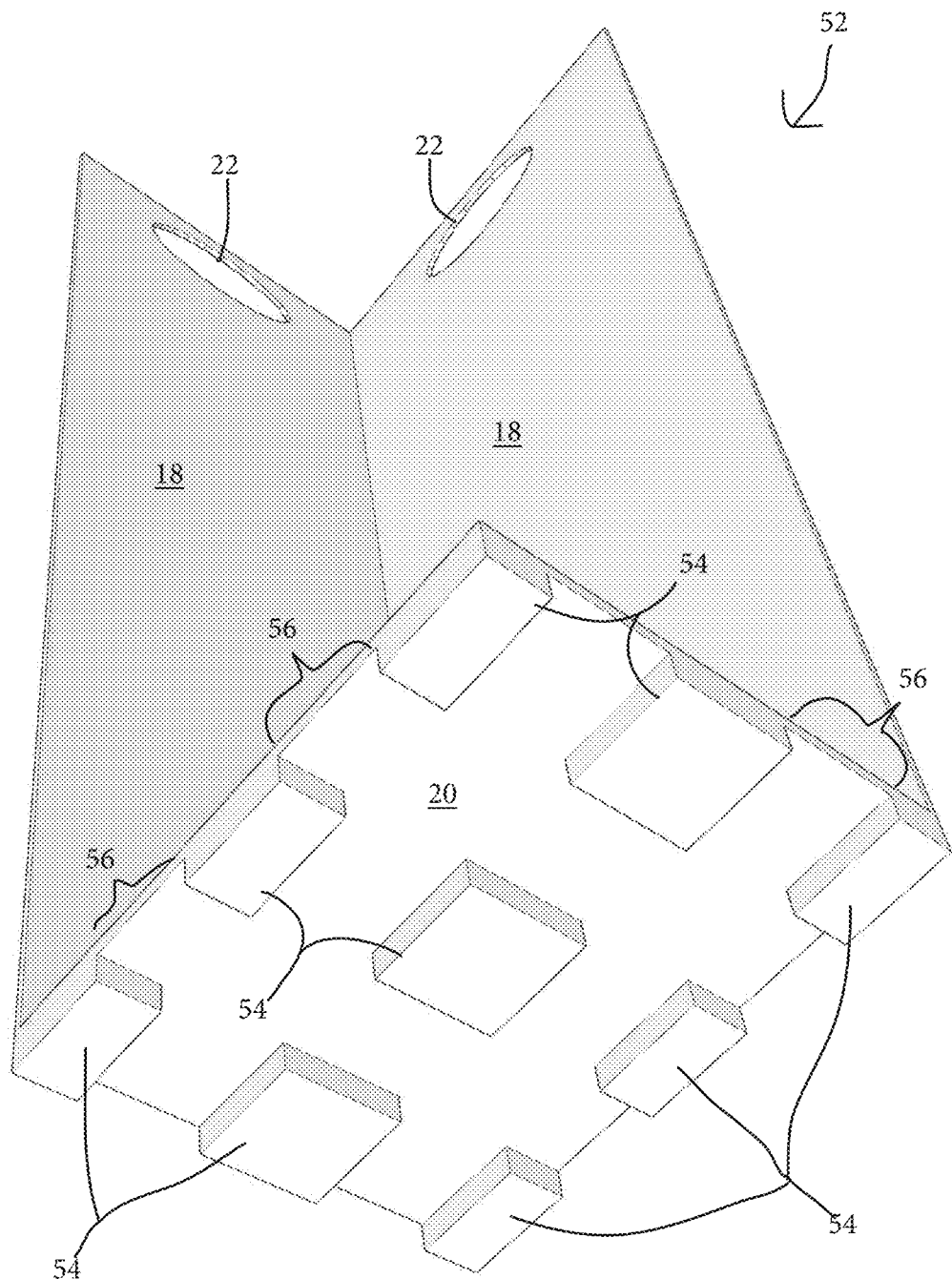
FIG. 13 is an enlarged bottom perspective view of another palletizing sleeve, in accordance with the present invention.

Referring to the illustrative embodiment of FIG. 13, another vertical support element 50 for a palletizing sleeve 52 includes a rectangular grid of support blocks 54 similar to that of vertical support element 19 described above, however with fewer receiver channels 56. The palletizing sleeve 52 includes vertical walls 18, a support base 20, and handles 22 similar to their corresponding structure of sleeve 10 described above.

Referring to the illustrative embodiment of FIGS. 14-16, an actuating hand truck 58 includes a selectively operable fork height adjustment system 60 for raising and lowering the forks 62 relative to the bottom of the hand truck 58. The hand truck 58 is similar to hand truck 16 in many aspects and includes a body 28, wheels 30, handle 32, secondary handle 33, and fulcrum 34 similar to that of hand truck 16 described above. The adjustment system 60 provides for retrieving palletizing sleeves (e.g. sleeve 10 of FIGS. 2-10 or sleeve 52 of FIG. 13) from a pallet 14 while the wheels 30 of the hand truck 58 are on the ground surface adjacent to the pallet 14 such that the palletizing sleeve does not need to be unloaded by hand to the ground surface before using the hand truck 58. Once the palletizing sleeve has been retrieved and removed from the pallet, the forks 62 can be lowered with the height adjustment system 60 toward the ground surface. The adjustment system 60 facilitates seamless and efficient movement of palletizing sleeves from the pallet 14 to the ground surface. The adjustment system 60 may include springs to assist the raising and lowering of the forks 62. The adjustment system 60 may be manually actuated by an operator to raise and lower the forks 62 or the adjustment system 60 may be automatic such as with an electric motor to raise and lower the forks 62. The hand truck 58 with the selectively operable adjustment system 60 and forks 62 allow an entire palletizing sleeve and its contents to be lifted off the pallet 14 at once.

The following describes a preferred embodiment of the method 100 including the steps of determining and evaluating 102, with pallet building software, the orders and routes provided by the automated order fulfilment system to create 104 individual palletizer sleeve builds and an overall pallet build plan which includes the use of column stacks on individual palletizer sleeves 10. Individual goods 12 or cases of goods making up the required shipment of goods are inducted to an AMCAP system to fulfill the orders. The palletizer builds 106 the physical build of goods, wherein an empty pallet 14 is inducted to a lift of an automated palletizer and then a first set of three (3) palletizing sleeves 10 are automatically loaded onto the empty pallet 14 prior to any cases being palletized. The sleeves 10 occupy a rear portion of the pallet 14 and when the pallet 10 has been elevated to its max height position, a stabilizing jig engages with the three sleeves 10 to hold them in place and insure precise positioning of goods 12 is maintained. Individual goods 12 or cases of goods are inserted into the first set of sleeves 10 by the automated palletizer until three (3) separate columns/stacks of shipments of goods have been built. Next, the pallet lowers and three (3) additional sleeves 10 are positioned on the front of the pallet 14. The pallet 14 raises and the additional sleeves 10 are filled with individual goods 12 or cases of goods 10 by the automated palletizer. Once the pallet 14 is completed, the pallet is lowered and wrapped with plastic wrap 15. The pallet 14 is then transported 108 and loaded for delivery onto a transport vehicle, such as a delivery truck. An operator or delivery personnel then delivers 110 each sleeve 10 with a shipment of goods with the forked hand truck 16 by removing a single sleeve 10 from the pallet 14 and delivering it to the pre-determined delivery destination.

Thus, the method makes column stacks of dedicated cartons with automated palletizing equipment which can be easily unloaded in a route delivery type of environment. The method provides various advantages including reducing route driver delivery labor and reducing product damage. The method reduces driver unloading times, reduces driver fatigue and injuries. The method can be used for mixed pallets/mixed sleeves to deliver one portion of a sleeve to one destination and the other portion of the sleeve to a different destination. The palletizing sleeves provide a container to support and stabilize independent shipments of goods that do not require an entire pallet, such that multiple shipments of goods can be stacked onto one pallet. A hand truck is provided to remove individual sleeves from the height of the top of the pallet and transport them to a ground surface of a delivery destination. The method and sleeve system are useful in many industries and applications, including food service, beverage service, and convenience store service.

Changes and modifications in the specifically described embodiments can be carried out without departing from the principles of the present invention which is intended to be limited only by the scope of the appended claims, as interpreted according to the principles of patent law including the doctrine of equivalents.

The embodiments of the invention in which an exclusive property or privilege is claimed are defined as follows:

1. A method for preparing shipments of goods and transporting the shipments to delivery destinations; said method comprising:
   determining an inventory of goods to be delivered to a delivery destination;
   virtually building an optimized virtual build for the inventory of goods to be delivered on a palletizing sleeve, the optimized virtual build providing a stable arrangement of the inventory of goods based on the dimensions of the palletizing sleeve; and
   physically building a stack of the inventory of goods based on the optimized virtual build of the inventory of goods on a palletizing sleeve;
   wherein the palletizing sleeve comprises a base having a plurality of sides defining a perimeter of the base, and comprises at least one vertical wall extending upwardly from at least one side of the base, and wherein the base comprises at least one side without an upwardly extending wall to define a side opening in the palletizing sleeve and the at least one vertical wall defines an upper opening in the transport sleeve that remains open for transporting the shipments to the delivery destinations.

2. The method of claim 1, further comprising transporting the palletizing sleeve to a delivery destination and unloading the palletizing sleeve at the delivery destination.

3. The method of claim 1, further comprising arranging a plurality of the palletizing sleeves with goods on a pallet, transporting the pallet to a delivery destination, and unloading a required one of the palletizing sleeves from the pallet at the delivery destination.

4. The method of claim 1, wherein the determining an inventory of goods is performed by an automated order fulfilment management system.

5. The method of claim 1, wherein the virtually building an optimized build is performed by an automated build optimizer.

6. The method of claim 1, wherein the physically building the optimized build is performed by a palletizer comprising an automated mixed case palletizing system that is configured to physically build the stack of the inventory of goods without raising the goods above the upwardly extending wall.

7. The method of claim 6, wherein the automated mixed case palletizing system comprises a robotic palletizer.

8. The method of claim 1, wherein the palletizing sleeve further comprises a plurality of support blocks spaced along a lower portion of the rectangular base and configured to provide openings to receive forks of a hand truck between a surface supporting the palletizing sleeve and the rectangular base.

9. The method of claim 8, wherein the transporting the palletizing sleeve comprises placing the palletizing sleeve onto a pallet, transporting that pallet to a delivery truck, driving the delivery truck to the delivery destination, and unloading the palletizing sleeve from the pallet with a forked transport vehicle having forks that are insertable into the openings between the support blocks of the rectangular base.

10. The method of claim 8, wherein the unloading the palletizing sleeve is performed by a human operator using a forked hand truck having forks that are insertable into the openings between the support blocks of the rectangular base and configured to engage a lower portion of the rectangular base of the palletizing sleeve.

11. The method of claim 1, wherein a plurality of shipments for different destinations are prepared by said method and the inventory of goods for a particular palletizing sleeve include goods for only a particular one of the different destinations.

12. A container for transporting goods, said container comprising:
- a base portion having a plurality of sides defining a perimeter of the base, said base portion configured to support a plurality of goods thereon;
- at least one vertical wall extending upwardly from at least one side of said base portion, said base portion comprising at least one side without an upwardly extending wall to define a side opening in said container and said at least one vertical wall defining an upper opening in the palletizing sleeve that remains open; and
- a vertical spacing element disposed at a lower portion of said base portion and configured to receive a fork of a hand truck between a portion of said base portion and a surface supporting said container;
- said base portion and said vertical wall cooperate to support a plurality of goods stacked on said container and stabilize the stack of goods.

13. The container of claim 12, wherein said base portion comprises a rectangular perimeter and wherein said at least one vertical wall comprises two vertical walls extending from two sides of said rectangular perimeter of said base portion.

14. The container of claim 12, wherein said vertical spacing element comprises a plurality of lower support blocks spaced along a bottom portion of said base portion to provide standoff between said base portion and the surface supporting said container, wherein said plurality of lower support blocks are located in spaced arrangement on the bottom portion of said base portion such that forks of a hand truck are insertable underneath a portion of said base portion.

15. The container of claim 14, further comprising a goods riser defined by a plurality of upper support blocks spaced along an upper portion of said base portion to provide standoff between said base portion and the goods supported thereon, and to define elongated channels spanning the majority of said base portion between said base portion and the goods supported thereon, wherein said plurality of upper support blocks are located in spaced arrangement on the upper portion of said base portion such that forks of a hand truck are insertable into said elongated channels underneath a portion of the goods supported on said base portion.

16. The container of claim 12, wherein said vertical wall and said support base are configured such that a plurality of said containers are nestable and stackable with one another when not supporting goods thereon with the base of one said container disposed on the base of another said container.

17. The container of claim 12, further comprising a machine readable identification label.

18. A palletizing sleeve comprising:
- a support base having a plurality of sides defining a perimeter of said support base, and comprising a rectangular grid of a plurality of standoff support blocks and a plurality of receiver channels defined by openings between adjacent ones of said standoff support blocks, said receiver channels configured such that a fork portion of a transport vehicle is insertable into said receiver channels to engage said palletizing sleeve from underneath a portion of said support base; and
- a vertical wall extending upwardly from at least one side of said support base and defining an upper opening in the palletizing sleeve that remains open, wherein said support base comprises at least one side without an upwardly extending wall to define a side opening in said palletizing sleeve, and wherein said vertical wall is configured to confine a portion of goods supported at said support base.

19. The palletizing sleeve of claim 18, wherein said rectangular grid defines receiver channels perpendicular to each side of said rectangular grid such that a plurality of said receiver channels are accessible from any of the sides of said perpendicular grid.

20. The palletizing sleeve of claim 18, further comprising a goods riser defined by a plurality of upper support blocks spaced along an upper portion of said support base to provide standoff between said support base and goods supported thereon, wherein said plurality of upper support blocks are located in spaced arrangement on the upper portion of said support base such that forks of a hand truck are insertable underneath a portion of the goods supported on said support base.

* * * * *